June 23, 1959   C. F. IRVIN   2,891,829
LOCKING DEVICE FOR BEARINGS
Filed June 5, 1957

United States Patent Office 2,891,829
Patented June 23, 1959

2,891,829

LOCKING DEVICE FOR BEARINGS

Charles F. Irvin, Lima, Ohio, assignor to Westinghouse Electric Corporation, East Pittsburgh, Pa., a corporation of Pennsylvania Application June 5, 1957, Serial No. 663,664

5 Claims. (Cl. 308—236)

The present invention relates to a bearing bracket construction and, more particularly, to an improved bearing bracket construction for dynamoelectric machines in which a simplified and convenient bearing locking device is provided for assembling and holding the bearing in its seat.

In present dynamoelectric machines having ball bearings pressed on the shaft, the ball bearings are held in the bearing seats on the end brackets by means of a clamping washer and screws. Tedious assembly practices are required to connect the ball bearing clamping washer on the inside of the motor with the clamping screws which are inserted from the outside. One design which has been devised to overcome this expensive, difficult and tedious method of assembly is the provision of a pivoted locking dog in place of a clamping washer. The locking dog is threaded onto a screw which extends through the end bracket prior to assembly. The threads of either the locking dog or the screw are mutilated so that upon rotation of the screw from the exterior, the locking dog first swings therewith against a stop member and then by continued rotation of the screw, the locking dog is drawn against the inner side of the bearing. While this design facilitates assembly, certain serious, inherent disadvantages are introduced. The mutilation of the threads requires an additional precise machining operation in order that the locking dog will turn with the screw while at the same time, care must be taken to prevent such mutilation of the threads as will hinder the screw from holding tight. No positive means are provided for guiding the locking dog into bearing locking position and it is entirely possible to draw the locking dog against the bracket in a position not overlying the bearing with the above construction.

The principal object of the present invention is to provide an improved end bracket and bearing assembly which includes a locking device for the bearing which simplifies assembly.

Another object of the invention is to provide an improved end bracket and bearing assembly having a locking device for the bearing wtih means for locking the bearing in place.

A further object of the invention is to provide an improved end bracket and bearing assembly particularly for use in a dynamoelectric machine with a locking device for retaining the bearing in position which may be operated from the exterior side of the end bracket and which is positively guided and retained in bearing locking position.

Other objects and advantages of the invention will be apparent from the following detailed description, taken in connection with the accompanying drawing, in which.

Figure 1:
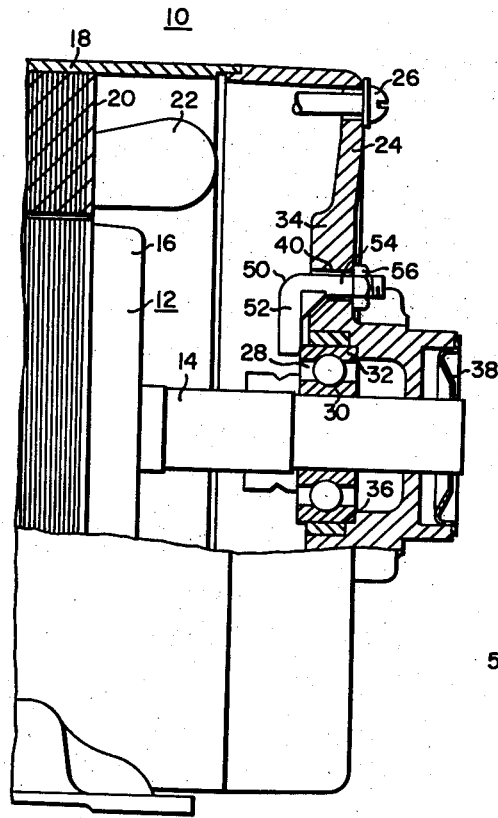
Figure 1 is a fragmentary sectional view through an end bracket of a dynamoelectric machine embodying this invention.

Referring now to the drawings, there is shown in Fig. 1 a dynamoelectric machine 10 having a rotor 12 mounted on a shaft 14. The rotor 12 is shown as being of the squirrel cage type including a plurality of laminations in which squirrel cage bars (not shown) are positioned in suitable slots and are connected by end rings 16. This machine has the usual cylindrical stator frame 18 in which is supported a laminated stator core 20 of any suitable or usual construction. Suitable stator windings 22 are placed in slots in the core 20 in the usual manner. An end bracket 24 is secured to the stator frame 18 in any desired manner; as for example, by through bolts as shown in Fig. 1 at 26. The rotor shaft 14 is supported for rotation in the end bracket by a ball bearing 28 having an inner race 30 pressed on the shaft and an outer race 32. The inner side of the end bracket 24 has a central hub 34 provided with a central bearing seat 36. The bearing 28 is held in the bearing seat 36 in a manner to be hereinafter described. A dust cap 38 is provided on the outside of the end bracket to cover the shaft receiving opening.

The motor is assembled by pressing the bearing 28 on the shaft 14. The rotor is positioned within the stator core and the end bracket is then assembled to the stator frame. The ball bearing 28 slides into the bearing seat and the through bolts 26 are then secured in position.

The present invention provides a unique construction for retaining the bearing 28 in the bearing seat 36. Two locking screw holes 40 are provided in the end bracket through the hub 34 just outside the bearing seat 36. The slot 42 extends radially from the edge of the bearing seat to each locking screw hole 40 and is of the same width as the diameter of the locking screw holes. An arcuate cam surface or land 44 concentric with the locking screw hole 40 is formed on the hub adjacent the bearing seat. The cam 44 slopes downwardly toward the edge of slot 42. On the end of the cam 44 remote from the edge of the slot 42 is an upstanding stop 46. On the edge of the slot remote from the cam is another upstanding stop 48. A flat section or pre-assembly land 45 is formed on the cam adjacent stop 46. Preassembled in the end bracket is an L-shaped locking member 50, one leg of which 52 is a tang which rides on the cam 44 toward the slot 42 between stops 46 and 48. The other leg 54 is a locking screw which is received in locking screw hole 40. The free end of the leg 54 is threaded to receive a nut 56. In preassembled position, the tang 52 lies on the flat portion 45 of cam 44 adjacent the bearing seat. The flat portion 45 of cam 44 permits preassembly of locking member 50 in the preassembled position firmly enough so that normal assembly can be effected without the member 50 shifting position. Then further application of force to nut 56 rotates the locking member 50. Upon rotation of the locking screw, tang 52 rides along the cam 44 and is drawn into the slot 42, in which position the free end of the tang 52 overlies the outer race 32 of bearing 28. When the nut 56 is tightened, bearing 28 is held firmly in position.

Figure 3:
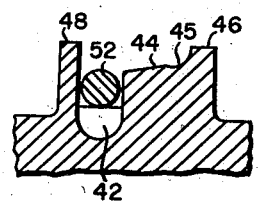
Fig. 3 is a sectional view on line III—III of Fig. 2.
Figure 4:
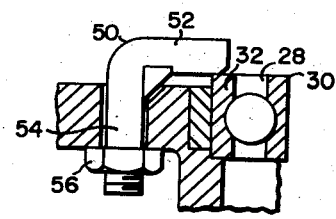
Fig. 4 is a sectional view on line IV—IV of Fig. 2.
Figure 2:
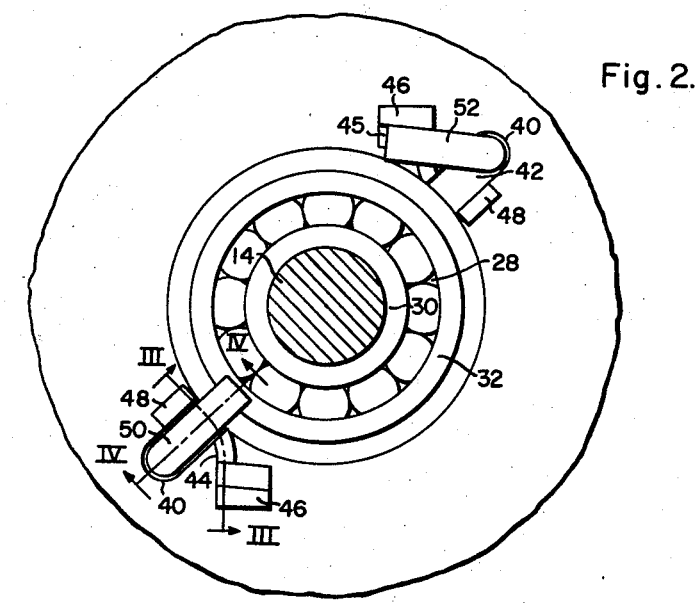
Fig. 2 is a partial elevation view of the inside of an end bracket incorporating this invention.

The operation of the device should now be apparent. The bearing 28 is placed on the shaft 40 and pressed thereto. The rotor is assembled in the stator core and the end shield is assembled with the frame after the end bracket 24 is preassembled with the locking member 50 in the position shown in the upper right portion of Fig. 2. The end bracket is then secured to the stator frame and through bolts 26 are tightened. When the motor assembly is completed and the bearing is seated in the bearing seat, the bearing may be locked by tightening the two nuts 56 on the outside of the end shield. The turning torque of the nut combined with the slope of the cam, shown most clearly at 44 in Fig. 3, draws the locking screw tang 52 into the slot 42, in which position the free end of the tang overlies the outer race of the bearing. The stops 46 and 48 limit pivotal motion of the tang to the cam surface and slot 42. Upon completion of the tightening operation, the bearing is firmly held by locking member in two positions 180° apart as shown in Fig. 2. Thus, applicant has provided a locking device for retaining a bearing in a bearing seat of an end bracket which greatly simplifies the assembly procedure and provides a firm positive bearing securing means.

One embodiment of the invention has been illustrated and described for the purpose of illustration, but it will be apparent that various modifications and other embodiments are possible within the scope of the invention. It is to be understood, therefore, that the invention is not limited to the specific arrangement shown, but in its broadest aspects, it includes all equivalents and modifications which come within the scope of the invention.

I claim as my invention:

1. In an assembly including one member having an inner inaccessible side and an outer side, a recess in said inner side and a second member seated in said recess, the combination comprising, a pivotal tang on said inner side for retaining said second member in said recess, cam means adjacent said recess for guiding said tang from a position laterally and longitudinally spaced from said second member to a position overlying and in firm engagement with said second member, means accessible from the outer side of said one member for drawing said tang along said cam toward said engaging position, and stop means for limiting pivotal movement of said tang beyond said engaging position.

2. In a bearing bracket, a bearing seat on the inner side thereof, a bearing received in said bearing seat, a slot in said bracket extending radially outward from said bearing seat, a pivoted tang pivotal from a position radially and axially spaced from said bearing seat to a position within said slot, said tang overlying said bearing and in firm engagement therewith when positioned in said slot, an arcuate cam concentric with the pivotal axis of said tang and sloping from a position radially and axially spaced from said slot toward said slot, said tang riding on said cam, and means accessible from the outer side of said bracket for drawing said tang along said cam into said slot for firm engagement with said bearing.

3. In an end shield for a dynamoelectric machine including a bearing seat having a locking screw opening spaced radially outward from said bearing seat, a bearing locking device comprising a locking screw received in said opening, a tang rigidly secured to said locking screw and substantially perpendicular thereto, a slot in said end shield extending from said opening to the edge of said bearing seat, an arcuate cam concentric with said aperture sloping radially and axially toward an edge of said slot, a first abutment at the end of said cam remote from said slot, a second abutment adjacent the edge of said recess remote from said cam, said tang movable on said cam between said first abutment and said slot and having its free end overlying and in engagement with said bearing when seated in said slot, and a threaded nut received on said locking screw exteriorly of said end shield whereby rotation of said nut on said locking screw draws said tang along said cam into said slot to firmly hold said bearing in place.

4. In a bearing bracket having a central bearing seat for a cylindrical bearing and a bearing in said seat, a bearing locking device comprising bearing locking screws received in openings in said bracket radially spaced from said bearing seat, a tang rigidly secured to each of said locking screws and substantially perpendicular thereto, the free end of said tang overlying and in engagement with said bearing in assembled position, a slot extending radially from the edge of said bearing seat to said openings for retaining said tang in assembled position, cam means for guiding said tang into said slot upon rotation of said locking screw, and a nut for drawing said locking screw and said tang into assembled position.

5. In an end bracket for dynamoelectric machines, said end bracket including an interior hub, a bearing seat in said hub, locking screw openings in said hub surrounding said bearing seat and a bearing in said bearing seat, the combination comprising, a locking screw received in each of said openings, a tang rigidly secured to said locking screw and substantially perpendicular thereto, the free end of said tang overlying said bearing in assembled position, slot means for retaining said tang in assembled position, cam means for guiding said tang into said slot means upon rotation of said locking screw, stop means for limiting pivotal motion of said tang and a nut on said locking screw for drawing said locking screw and tang into assembled position.

References Cited in the file of this patent

UNITED STATES PATENTS

| 1,329,289 | Carter | Jan. 27, 1920 |
| 2,232,478 | Sack | Feb. 18, 1941 |
| 2,772,929 | Eastman | Dec. 4, 1956 |